United States Patent Office 2,961,460
Patented Nov. 22, 1960

2,961,460

ESTERS

Gerald Scott, Manchester, England, assignor to Imperial Chemical Industries Limited, London, England, a corporation of Great Britain No Drawing. Filed July 28, 1958, Ser. No. 751,135

Claims priority, application Great Britain Aug. 7, 1957

7 Claims. (Cl. 260—466)

This invention relates to esters and more particularly to hyponitrous esters especially useful as catalysts for the polymerisation of ethylenically unsaturated compounds.

In application Serial No. 655,478 (filed April 29, 1957), now Patent No. 2,913,481, issued November 17, 1959, there are described new esters of hyponitrous acid wherein the organic residue contains at least one ether oxygen atom, preferably on an alpha carbon atom.

It has now been found that especially valuable esters are those wherein the organic residue contains one ether oxygen atom on the alpha carbon atom and said alpha carbon atom is attached otherwise only to carbon atoms.

Thus according to the present invention there is provided the improvement in or modification of the invention of application Serial No. 655,478 which comprises new esters of hyponitrous acid wherein both the organic residues contain one ether oxygen atom on the alpha carbon atoms and said alpha carbon atoms are attached otherwise only to carbon atoms.

The new organic hyponitrites have the formula ROCR'R"ON=NOCR'R"OR wherein R, R' and R" stand for organic radicals, the same or different, and R and R' or R' and R" may be linked together so as to form, with the alpha carbon atom, a ring. More particularly, R may be alkyl, cycloalkyl, aralkyl, aryl or heterocyclic; R' and R" may be alkyl, aryl, aralkyl, cycloalkyl, heterocyclic or may together and with the alpha carbon atom be cycloalkyl, heterocyclic, saturated or unsaturated and may carry further substituents such as cyano, carboxylic ester, halogen, alkyl preferably on the alpha carbon atom. Of these we prefer the organic hyponitrites in which R' and R" together with the alpha carbon atoms from cycloalkyl rings, as the hyponitrites then decompose to free radicals and nitrogen at particularly low temperatures and are effective as polymerisation catalysts at particularly low temperatures.

The manufacture of the organic hyponitrites may be performed in the general manner described in application Serial No. 655,478 except that due to their lower stability, the compounds must be prepared and stored at an appropriately lower temperature than those described in that specification, and the general properties of the hyponitrites are also similar. In particular, however, the new hyponitrites are more efficient catalysts than those described in that specification.

Specific examples of the new hyponitrites are bis(1-methoxy-1-methylethyl), bis(1-ethoxy-1-methylethyl), bis(1-nonyloxy-1-methylethyl), bis(1-methoxy-cyclopropan-1-yl), bis(1-methoxy-cyclobutan-1-yl), bis(1-methoxy-cyclopentan-1-yl), bis(2-methyltetrahydrofuran-2-yl), bis(1-methoxy-1-methylisobutan-1-yl), bis(1-methoxy-1-methylneopentan-1-yl), bis(1-methoxy-2:2:4:4-tetramethylcyclobutan-1-yl), bis(1-methoxy-2-carbomethoxy-cyclobutan-1-yl), bis(1-methoxy-2:5-dimethylcyclopentan-1-yl), bis(1-methoxy-1-cyclohexylmethyl), bis(1-methoxy-1-cyclo-octylethyl), bis(1-methoxy-1-methyl-2-carboethoxyethyl) hyponitrites.

The invention is illustrated but not limited by the following examples in which parts and percentages are by weight:

*Example 1*

27.6 parts of silver hyponitrite are stirred in 200 parts of dimethyl formamide at −45° C. and 22 parts of alpha-chloroisopropyl methyl ether are added slowly. The mixture is stirred at −45° C. for 2 hours, after which time the suspension is quite white. The mixture is filtered through a cooled filter funnel and the residue is washed with 100 parts of dimethyl formamide. A portion of the colourless solution is analysed for hyponitrite content by heating in an azotometer. All the gas is evolved below 70° C. and the nitrogen content of the gas corresponds to a 45% yield of bis(1-methoxy-1-methylethyl) hyponitrite.

*Example 2*

27.6 parts of silver hyponitrite are stirred in 200 parts of acetone at −75° C. and 25 parts of 1-chloro-methoxy-cyclobutane are added. The mixture is stirred as the temperature is allowed to rise slowly to −50° C. After stirring at −50° C. for a further 3 hours a solution of bis-(1-methoxy-cyclobutan - 1 - yl) hyponitrite is obtained which by the method of Example 1 contains 87% of the hyponitrite used.

*Example 3*

The process of Example 1 is repeated using 27 parts of 1-methoxy-cyclopentan-1-yl chloride. The mixture is stirred for 5 hours. Analysis of the filtered solution by the method of Example 1 indicates a yield of 50% of the hyponitrite.

*Example 4*

27.6 parts of silver hyponitrite are stirred in an atmosphere of dry nitrogen in 200 parts of toluene at −50° C. 22 parts of 1-methoxy cyclobutyl chloride are added over 30 minutes and the mixture is stirred in an atmosphere of dry nitrogen for 18 hours at −50° C. At the end of this time the pale yellow suspension is filtered through a sintered glass plate cooled at −30° C. On allowing an aliquot of the solution to warm to 5° C. in an azotometer nitrogen was evolved which corresponded to a yield of ester of 65% based upon the halide used.

*Example 5*

The method of Example 4 is repeated except that 24 parts of 1-methoxy cyclopentyl chloride were used instead of 1-methoxy cyclobutyl chloride. The yield of hyponitrous ester, decomposing below 25° C., based on chloride used is 79%.

*Example 6*

The method of Example 4 is repeated except that 29 parts of 1-methoxy cyclohexyl chloride were used. The yield of hyponitrous ester, based on chloride used, decomposing below 50° C. is 60%.

*Examples 7–11*

The method of Example 4 is repeated with a number of chlorides except that instead of excess silver hyponitrite being used, exactly equimolar proportions are used. The following is a representative preparation, the remainder are summarized in the table.

27.6 parts of silver hyponitrite are stirred in an atmosphere of dry nitrogen in 200 parts of toluene at −50° C. 21.8 parts of 2-methoxy-propan-2-yl chloride are added over 30 minutes and the mixture is stirred in an atmosphere of dry nitrogen for 16 hours at −50 to 0° C. The suspension is filtered at 10–20° C. and an estimate of yield obtained by the method of Example 4. The temperature range over which the nitrogen is evolved is recorded in the table.

| Example | Chloride | Parts of chloride used | Temperature range of decomposition, °C. | Yield Percent [1] |
|---|---|---|---|---|
| 7 | 2-Methoxy-propan-2-yl | 21.8 | 40–60 | 60 |
| 8 | 2-Methoxy-butan-2-yl | 24.6 | 35–55 | 60 |
| 9 | 3-Methoxy-pentan-3-yl | 27.4 | 30–50 | 85 |
| 10 | 2-Methoxy-3-methylbutan-3-yl | 27.4 | 35–55 | 90 |
| 11 | 3-Ethoxy-2,4-dimethylpentan-3-yl | 35.8 | 25–45 | 71 |

[1] Based on hyponitrite and chloride used.

I claim:

1. A bis-ester of hyponitrous acid in which each organic residue is selected from the group consisting of (1) a cycloalkyl ring bearing an alkoxy substituent on the carbon atom that is attached to the hyponitrite group but being otherwise unsubstituted and (2) a cycloalkyl ring bearing an alkoxy substituent on the carbon atom that is attached to the hyponitrite group and being further substituted with alkyl as the only other form of substitution.

2. Bis(1-methoxy-cyclopropan-1-yl) hypnotrite.
3. Bis(1-methoxy-2:2:4:4-tetramethylcyclobutan-1-yl) hypontrite.
4. Bis(1-methoxy-2:5-dimethylcyclopentan-1-yl) hyponitrite.
5. Bis(1-methoxy-cyclobutan-1-yl) hyponitrite.
6. Bis(1-methoxy-cyclopentan-1-yl) hyponitrite.
7. Bis(1-methoxy-cyclohexan-1-yl) hyponitrite.

References Cited in the file of this patent

Partington et al.: "Jour. Chem. Soc." (London), 2593–97 (1932).